United States Patent
Chang et al.

(10) Patent No.: US 7,551,374 B2
(45) Date of Patent: Jun. 23, 2009

(54) SUSPENSION APPARATUS FOR AUTO-FOCUS LENS DEVICE AND A METHOD FOR FABRICATING THE SAME

(76) Inventors: Chi Lone Chang, No. 14, Alley 8, Lane 520, Syuefu Rd., Jhudong Township, Hsinchu County 310 (TW); Wen Tsai Hsu, No. 16, Alley 57, Sinmin Lane, Sinfong Township, Hsinchu County 304 (TW)

( * ) Notice: Subject to any disclaimer, the term of this patent is extended or adjusted under 35 U.S.C. 154(b) by 251 days.

(21) Appl. No.: 11/589,753

(22) Filed: Oct. 31, 2006

(65) Prior Publication Data

US 2007/0047108 A1 Mar. 1, 2007

Related U.S. Application Data

(62) Division of application No. 11/197,432, filed on Aug. 5, 2005, now Pat. No. 7,158,316.

(30) Foreign Application Priority Data

May 27, 2005 (TW) .............................. 94117390 A

(51) Int. Cl.
*G02B 7/02* (2006.01)
(52) U.S. Cl. ..................... 359/811; 359/815; 359/819
(58) Field of Classification Search ................ 359/811, 359/815, 818, 819, 822–823
See application file for complete search history.

(56) References Cited

U.S. PATENT DOCUMENTS

| 5,912,774 | A  | * | 6/1999 | Yoshida et al. ............... 359/823 |
| 6,443,633 | B1 | * | 9/2002 | Liberty et al. ................. 385/99 |
| 7,092,174 | B2 | * | 8/2006 | Yamaguchi et al. .......... 359/819 |
| 7,242,541 | B2 | * | 7/2007 | Araki .......................... 359/824 |
| 7,372,786 | B2 | * | 5/2008 | Choi et al. ............... 369/44.22 |

* cited by examiner

*Primary Examiner*—Timothy J Thompson
(74) *Attorney, Agent, or Firm*—Troxell Law Office PLLC

(57) ABSTRACT

A suspension apparatus comprises a lens holder, a suspension spring and a supporting base. The supporting base is formed with an opening for accommodating the lens holder. The lens holder is for positioning a lens unit. The suspension spring is manufactured by stamping process to form a long strip with a plurality of suspension springs. The strip is then guided into a mold, and plastic injection molding process is performed in that mold so as to produce the lens holder and supporting base affixed respectively to either end of the suspension spring in one piece. After that, excess material of the strip is cut off. The suspension apparatus as above described is suitable for mass production. In addition, because of the high precision of mold, the inaccuracy of assembly and fabrication is minimized. The volume of the whole apparatus and the cost of production are also vastly decreased.

9 Claims, 7 Drawing Sheets

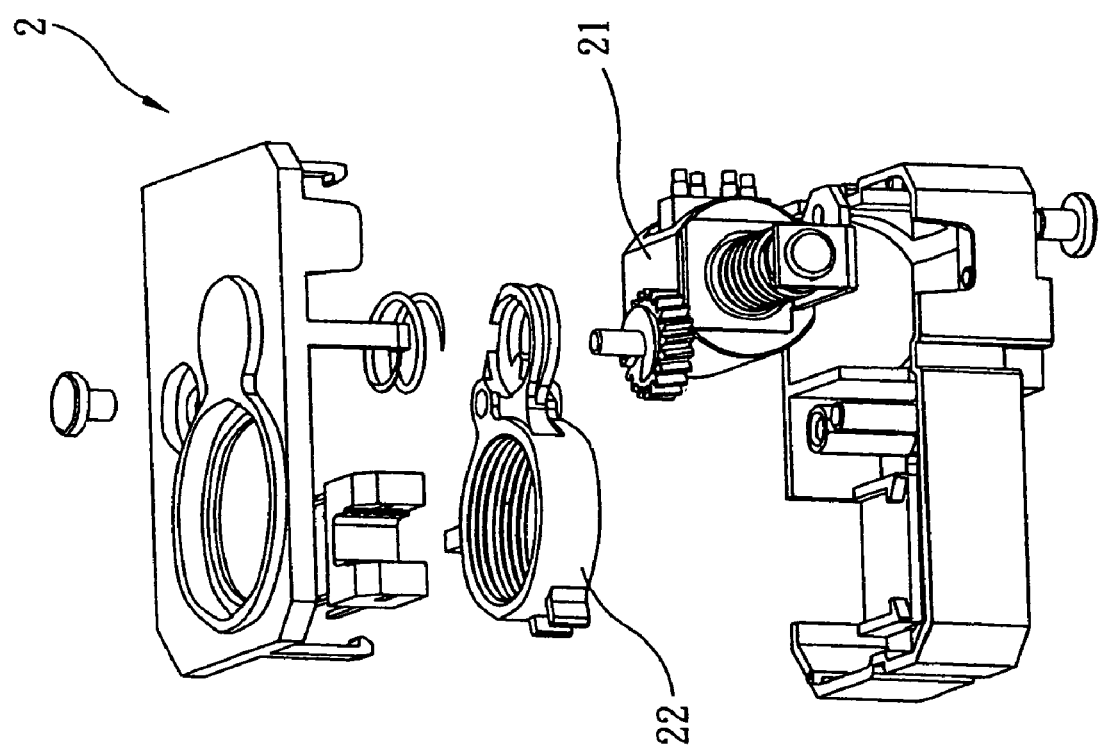

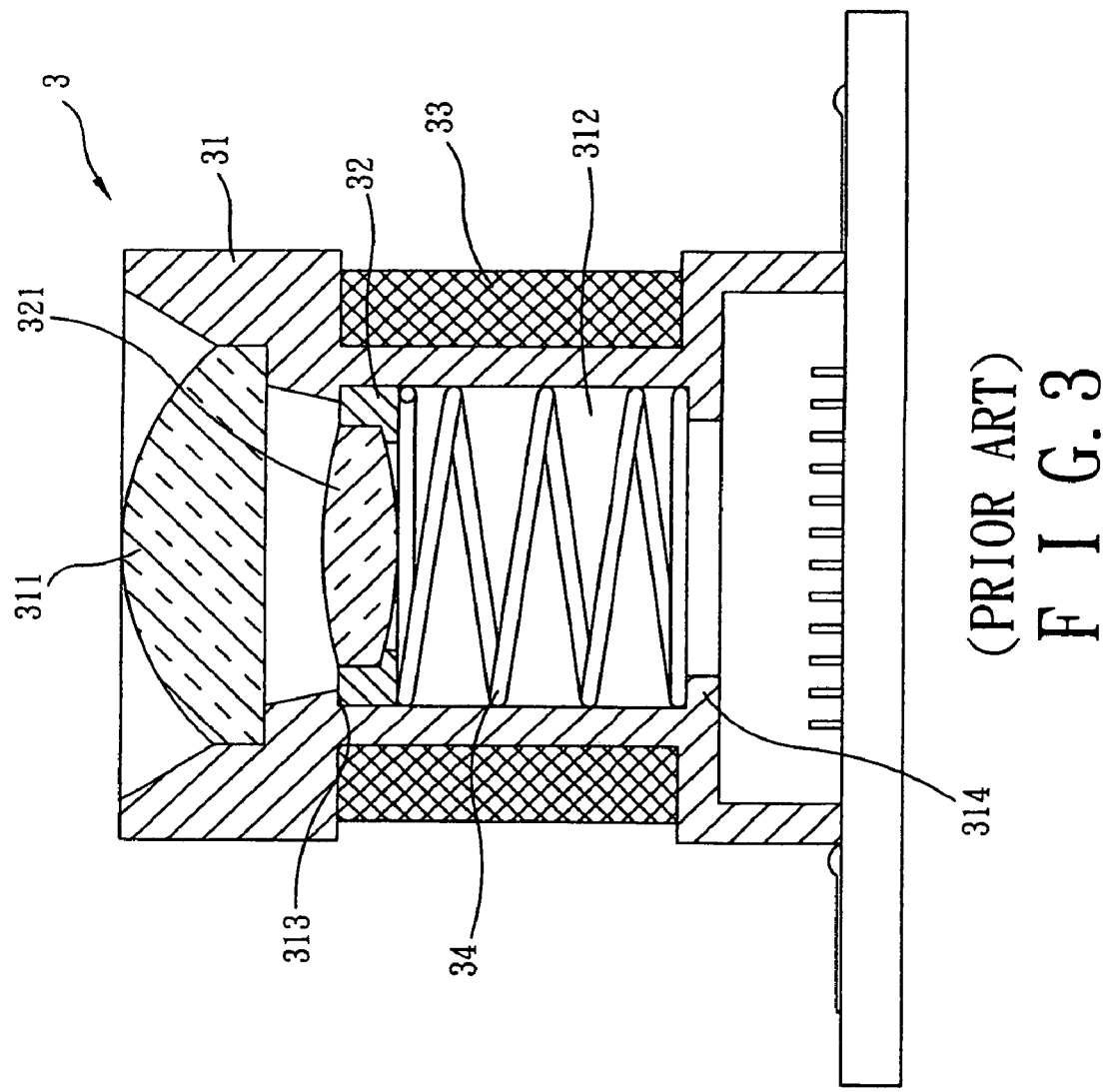

SUSPENSION APPARATUS FOR AUTO-FOCUS LENS DEVICE AND A METHOD FOR FABRICATING THE SAME

Related Applications

This application is a Division of application U.S. Ser. No. 11/197,432, entitled "A SUSPENSION APPARATUS FOR AUTO-FOCUS LENS DEVICE AND A METHOD FOR FABRICATING THE SAME" and filed on Aug. 5, 2005 now U.S Pat. No. 7,158,316.

BACKGROUND OF INVENTION

1. Field of the Invention

The present invention relates to a suspension apparatus for auto-focus lens device and a method for fabricating the same, more particularly an apparatus used in camera which provides the functions of suspension and support by forming a lens holder and a supporting base respectively at either end of a suspension spring in one piece by means of plastic injection molding.

2. Description of the Prior Art

A standard camera 1 comprises a lens set 11, a sensor 12 and a focusing mechanism (not shown in the figure). The lens set 11 forms an image on sensor 12 by refracting the light rays from an object (as shown in FIG. 1). If the distance between lens set 11 and sensor 12 (back focal length, BFL) is fixed, the lens can only show clearly objects at a specific distance (e.g. the hyperfocal distance of 2-3 meters away). For the camera to shoot objects at a close distance, the distance between lens set 11 and sensor 12 must be adjusted using a focusing and zooming mechanism.

The focusing and zooming mechanism 2 used in conventional camera (as shown in FIG. 2) typically includes an expensive precision drive element 21 (e.g. stepping motor, ultrasonic motor, and piezoelectric actuator) to supply the power needed to drive the lens holder 22 that carries the lens set 11 and a large number of driving elements. Such design has the deficiencies of complicated mechanical configuration, time-consuming assembly, bulkiness and high cost. Most seriously, it consumes a large amount of power. As technology advances, camera makers have been gearing their efforts towards developing high picture quality and small-sized products for easy carriage. Other electronic device makers also focus on integrating more functions in one device by, for example, combining the functions of photographing and mobile communication of handset, the functions of photographing and personal digital assistant (PDA), or the functions of photographing and notebook computer to give the device more powerful video functions. Based on the design of a common power supply having the same capacity as that for a device with single function, how to reduce the size and the cost of product, how to lower power consumption to effectively improve the standby time and run time of the integrated product become the focus of research for electronic product manufacturers.

In conventional focusing and zooming lens structure, an elastic element is often used to provide the functions of cushion, positioning and repositioning. A conventional lens unit 3 as shown in FIG. 3 comprises a lens mount 31 and a lens frame 32. The lens mount 31 has lens 311 at the top, a hollow space 312 in the middle, and an electromagnetic coil set 33 wound around its periphery at the bottom. The lens frame 32 is arranged in the space 312 of lens mount 31 and able to slide up and down the space 312. The lens frame 32 has two protruding members (not shown in figure) and the shape of space 312 complements that of lens frame 32 so that lens frame 32 will not turn in space 312 when sliding. The lens frame 32 is made of magnetically conductive metal material so that the magnetic force generated after the electromagnetic coil set 33 are charged can attract the lens frame 32 to displace downward. The lens frame 32 is disposed with a lens 321 therein. The upper part and lower part of space 312 in lens mount 31 has respectively an upper stop member 313 and a lower stop member 314 with lens frame 32 situated therebetween and a spring 34 disposed between the lens frame 32 and lower stop member 314. By such structural design, the lens frame 32 in the lens unit 3 can be pushed against the upper stop member 313 by the thrust from the spring 34. At the time of focus adjustment, electric current is passed through electromagnetic coil set 33 to generate magnetic force that can attract the metallic lens frame 32 to displace downward and achieve the objective of focus adjustment.

In the conventional lens unit structure just described, the spring 34 used is bulky, hence taking considerable space. On the other hand, in coordination with the use of spring 34, an upper stop member 313 and a lower stop member 314 must be disposed in the upper and lower sections of space 312 in lens mount 31, rendering the whole structure more complicated. Conventional lens unit assembles the lens mount 31, lens frame 32 and spring 34 one by one after they are separately fabricated. The whole assembly process is not only tedious and time consuming, the unavoidable inaccuracy in assembly also adds to the burden of quality control operation.

SUMMARY OF INVENTION

The primary object of the present invention is to provide a suspension apparatus for auto-focus lens device and a method for fabricating the same, characterized in which a lens holder and a supporting base are formed respectively at either end of a suspension spring in one piece by means of plastic injection molding, which offers the advantages of simplified assembly process and cost reduction.

Another object of the present invention is to provide a suspension apparatus for auto-focus lens device and a method for fabricating the same, which can effectively reduce assembly inaccuracy because of the high precision furnished by plastic moulds.

A further object of the present invention is to provide a suspension apparatus for auto-focus lens device and a method for fabricating the same, whereby one-piece molding is employed to allow the suspension spring in the apparatus to provide the functions of cushioning and repositioning for the two-way movements of lens holder and to greatly cut down structures required to connect various components so as to effectively reduce the volume of the whole apparatus.

Yet another object of the present invention is to provide a suspension apparatus for auto-focus lens device and a method for fabricating the same, wherein a flat-surface, circuitous and extending connecting member is designed in a suspension spring to provide a cushioning elasticity and greatly reduce the space needed.

To attain the aforesaid objects, in a preferred embodiment of the invention, the suspension apparatus for auto-focus lens device and a method for fabricating the same comprises a lens holder, a suspension spring and a supporting base. The supporting base is formed with an opening for accommodating a lens unit. The suspension spring is manufactured by stamping process to form a long strip with a plurality of suspension springs. The strip is then guided into a mold, and plastic injection molding process is performed in that mold, so as to produce the lens holder and supporting base affixed respectively to either end of the suspension spring in one piece. After that, excess material of the strip is cut off. The suspension apparatus as above described is suitable for mass production. In addition, because of the high precision of mold, the inaccuracy of assembly and fabrication is minimized. The volume of the whole apparatus and the cost of production are also vastly decreased.

BRIEF DESCRIPTION OF THE DRAWINGS

The details of the present invention will be more readily understood from a detailed description of the preferred embodiments taken in conjunction with the following figures.

FIG. 2 is an exploded view of conventional focus and zoom lens.

FIG. 3 is a sectional view of a conventional focus and zoom lens.

DETAILED DESCRIPTION

Figure 1:
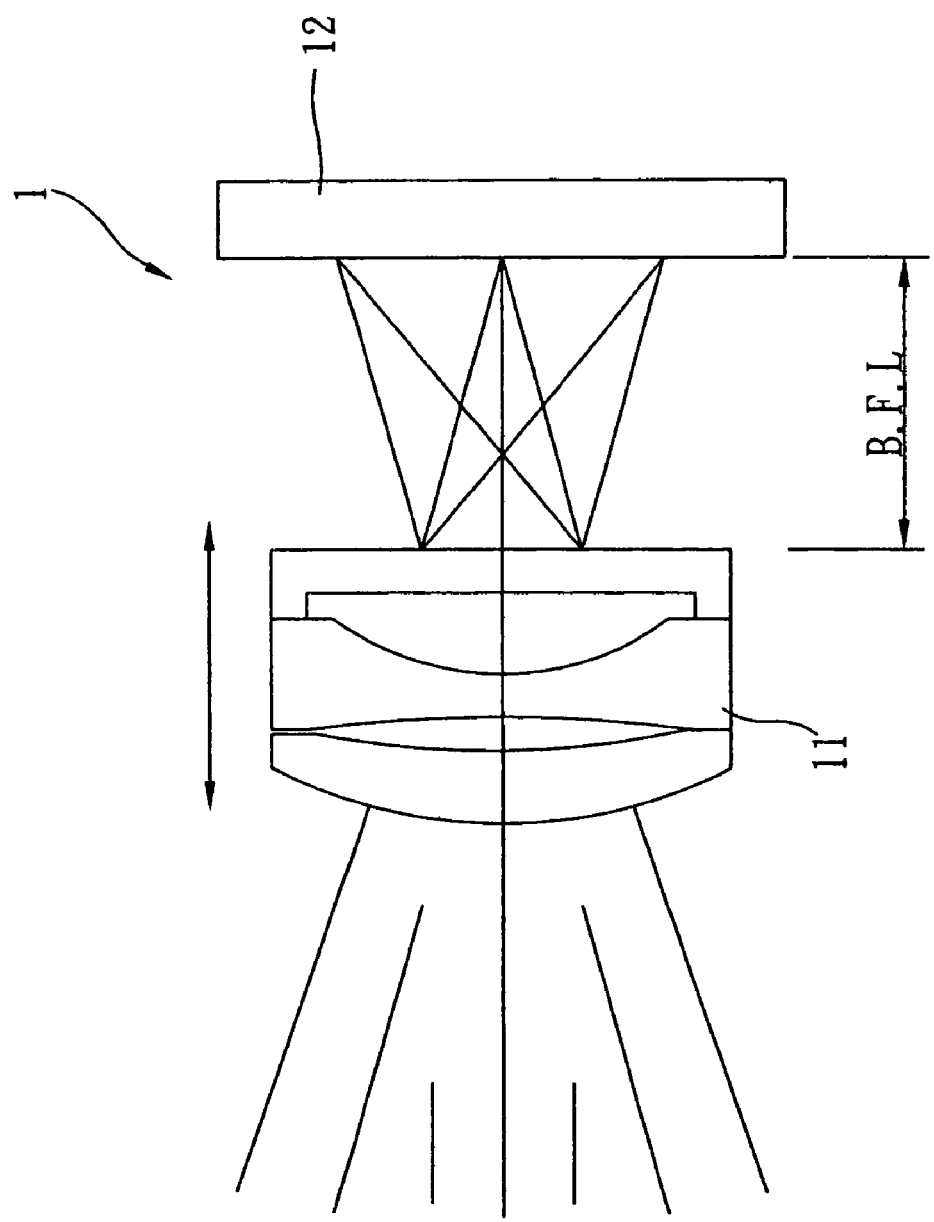
FIG. 1 is a diagram showing the focusing and zooming principle of conventional lens.
Figure 6:
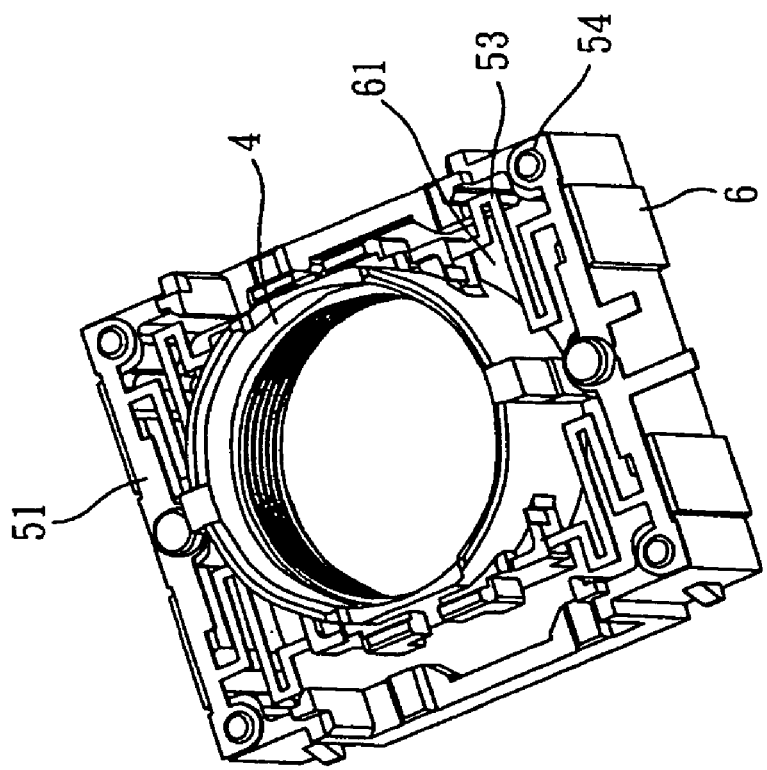
FIG. 6 is an external view of the suspension apparatus for auto-focus lens device in one piece after the removal of excess material.
Figure 4:
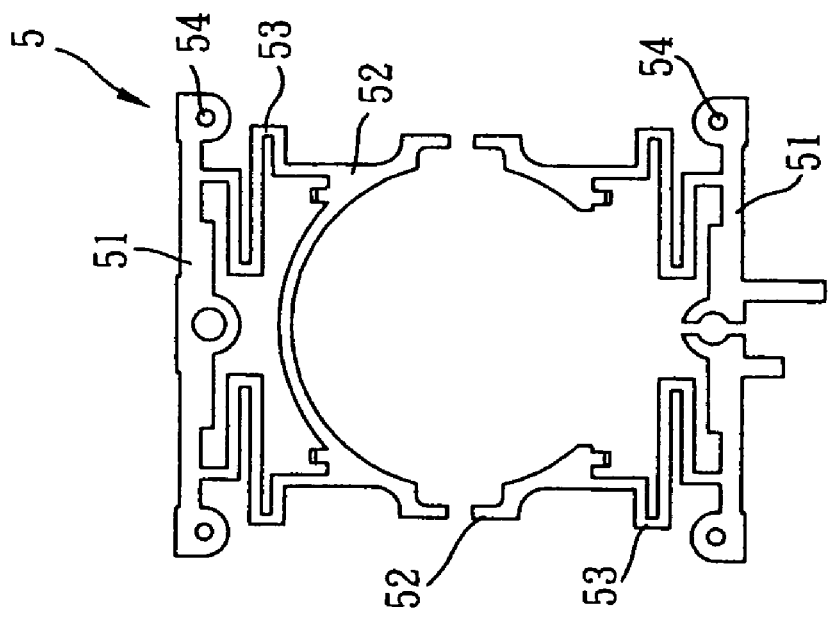
FIG. 4 is a schematic diagram of the suspension spring in the suspension apparatus for auto-focus lens device according to the invention.
Figure 5:
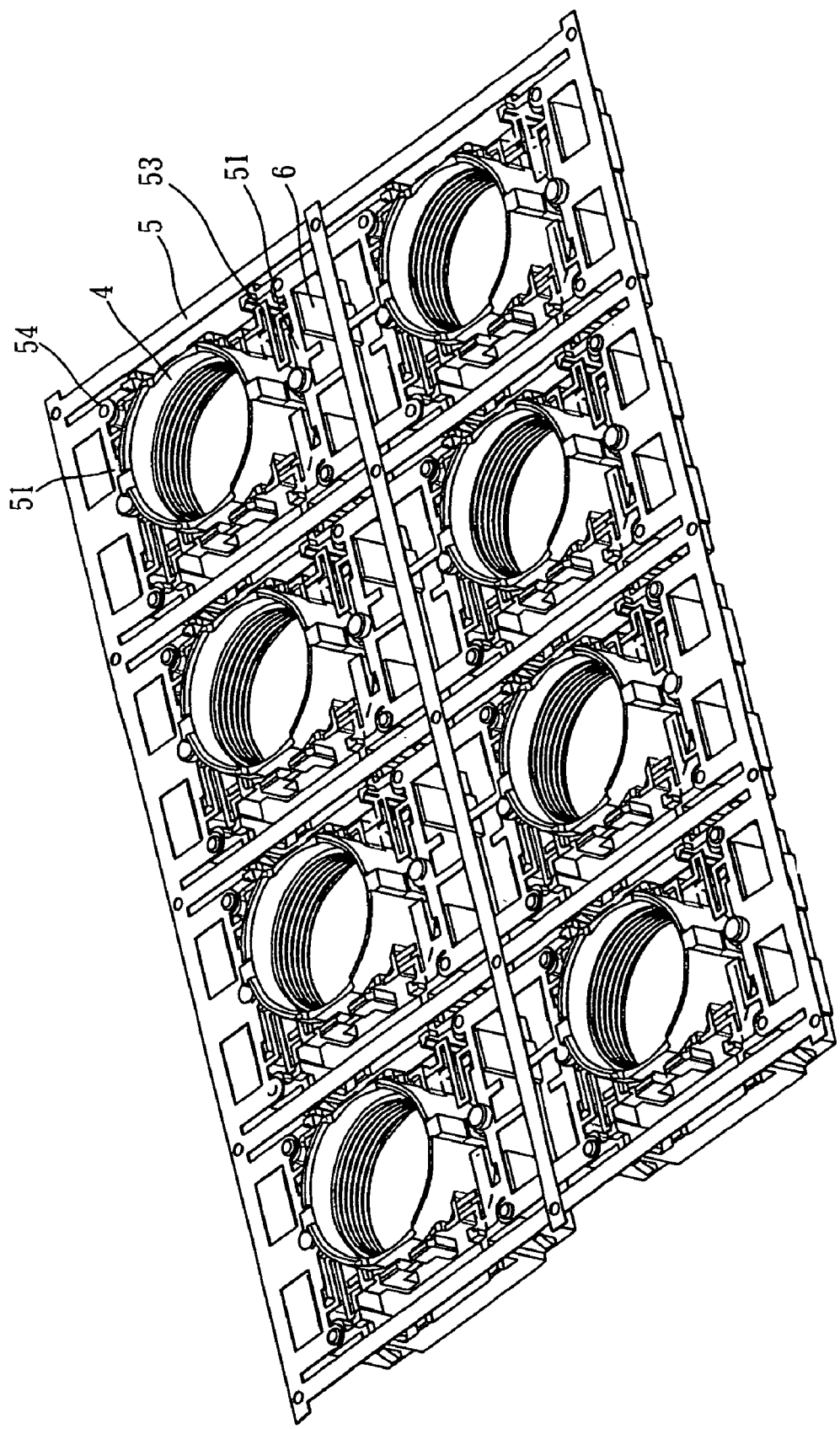
FIG. 5 is an external view of a plurality of lens holder and supporting base formed on suspension spring in the suspension apparatus for auto-focus lens device according to the invention.

FIGS. 4, 5 and 6 show a preferred embodiment of the suspension apparatus for auto-focus lens device and a method for fabricating the same according to the present invention. FIG. 4 is a schematic diagram of a suspension spring in the suspension apparatus for auto-focus lens device; FIG. 5 is an external view of the long strip in the suspension apparatus for auto-focus lens device formed in the injection molding process; FIG. 6 is an external view of the suspension apparatus for auto-focus lens device with suspension spring and supporting base attached thereto in one piece and excess material cut off.

As shown in FIG. 4 and FIG. 5, the suspension apparatus for auto-focus lens device in this embodiment comprises a lens holder 4, a suspension spring 5 and a supporting base 6. The supporting base 6 is formed with an opening 61 (please refer to FIG. 6) for accommodating the lens holder 4. The lens holder 4 is for positioning a lens unit (not shown in the figure). The suspension spring 5 is a flat plate made of metallic material by stamping process and further arranged with a base positioning end 51 and a lens holder positioning end 52 (as shown in FIG. 4) with at least one connecting member 53 formed therebetween. The connecting member 53 is a thin-strip structure with multiple bends (e.g. in S-shape) to allow limited bend and swing between base positioning end 51 and lens holder positioning end 52 so as to furnish cushioning elasticity and repositioning elasticity. The base positioning end 51 and the lens holder positioning end 52 on suspension spring 5 are respectively disposed with at least one through-hole 54 for positioning.

Based on the structure described above, the supporting base 6 and lens holder 4 can be formed simultaneously as two independent elements by means by injection molding, and in the same injection molding process, become attached to suspension spring 5 utilizing the through-holes 54 disposed on the base positioning end 51 and lens holder positioning end 52 of suspension spring 5 (as shown in FIG. 5). With the elasticity furnished by the connecting member 53 of suspension spring 5, the lens holder 4 can be suspended and maintained a position in the opening 61 configured in supporting base 6. By the aforesaid structure, the present invention not only saves the time of fabricating and assembling individual elements, the structure of individual elements which at times becomes complicated in consideration of assembly needs is also simplified. The cost of production is also vastly decreased.

In comparison with the spring 34 used in conventional structure, the flat suspension spring 5 used in the invention takes less space, thus helping to reduce the volume of the whole apparatus and making it suitable for application in other portable electronic products (e.g. mobile phone, PDA or notebook computer). The suspension spring 5 also provides two-way suspension support. On the other hand, the connecting member 53 with a plurality of bends in the suspension spring 5 not only increases the supporting force for lens holder 4 in a limited space, it effectively adds to the stroke length of lens holder to allow broader applications.

Figure 7:
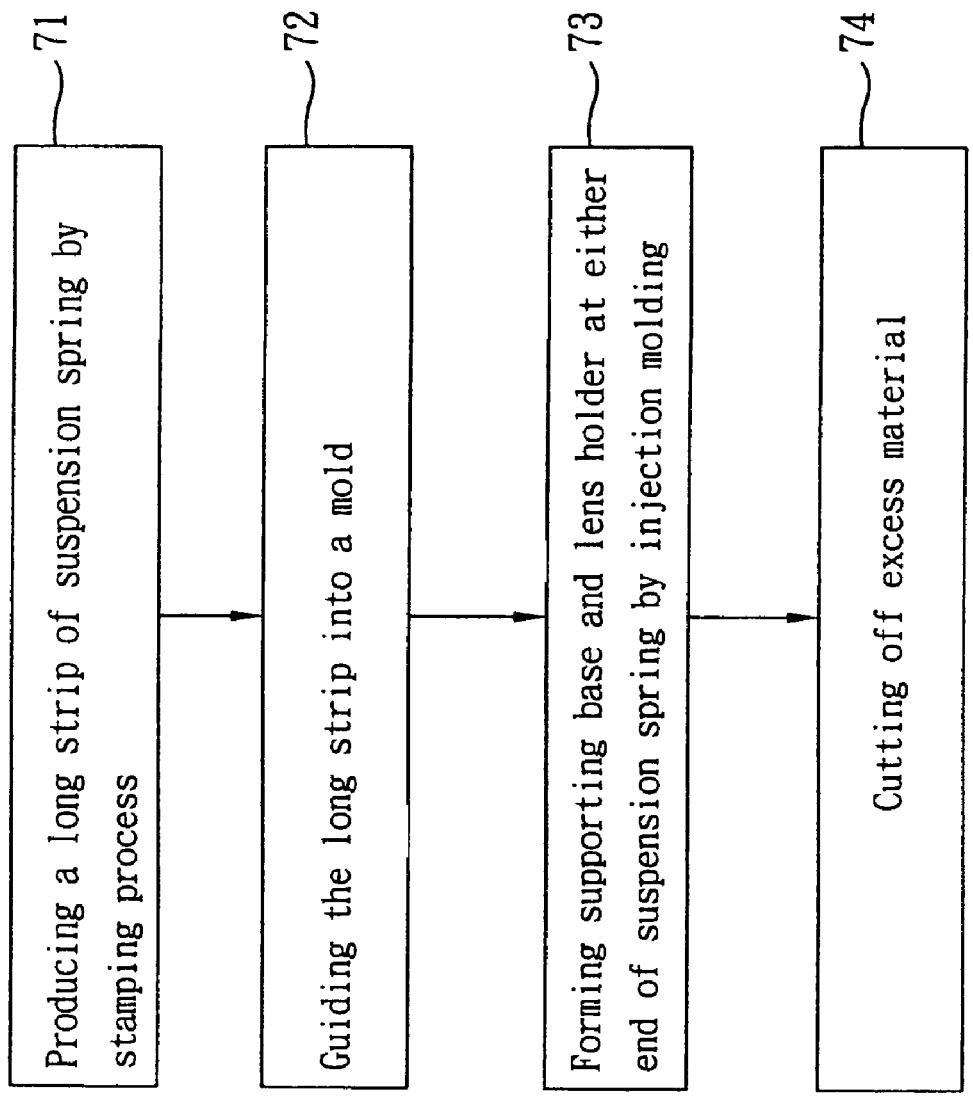
FIG. 7 is the flow process diagram showing the method for fabricating the suspension apparatus for auto-focus lens device according to the invention.

FIG. 7 is a flow process diagram illustrating the method for fabricating the suspension apparatus for auto-focus lens device, which is a simpler fabrication process in light of the structure described above (as shown in FIG. 7). This method features the steps of first manufacturing a long strip by stamping process (step 71), and then guiding the strip of suspension spring into a precision plastic mold (step 72) to produce simultaneously a plurality of supporting bases and a lens holder attached to either end of the suspension spring in one piece by plastic injection molding as shown in FIG. 5 (step 73). The excess material is then removed (step 74) to form a unitary member as shown in FIG. 6. Using the supporting force furnished by suspension spring 5, lens holder 4 can be suspended in the opening 61 configured on supporting base 6 and engage in limited vertical displacement relative to the supporting base 6 under external force. When lens holder is not under external driving, it is kept at a fixed position under the reposition force of suspension spring 5. By the fabrication method just described, the suspension apparatus of the present invention is suitable for mass production. In addition, because of the high precision provided by plastic mold, the assembly inaccuracy is minimized and the fabrication process simplified. The volume of the whole apparatus and the cost of production are also significantly decreased.

Figure 8:
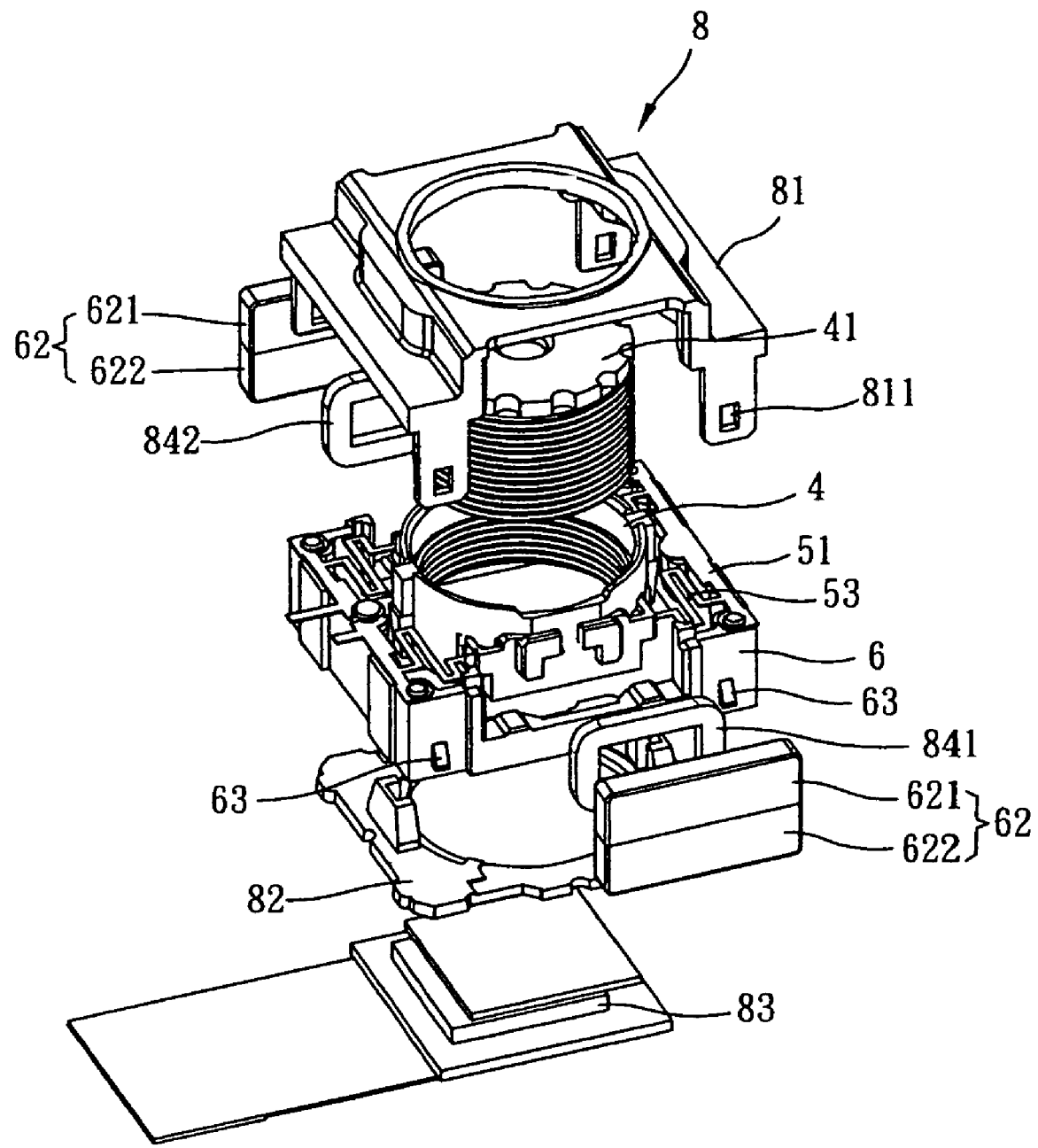
FIG. 8 is an external view of an embodiment of the present invention mounted in a focusing device.

FIG. 8 is an external view of an embodiment of the present invention mounted in a focusing device 8, in which the lens holder 4 is further arranged with a lens barrel 41 thereon and a cover 81 is snapped to the supporting base 6. The cover 81 and lens barrel 41 are not adjoined to each other. The bottom of the supporting base 6 is connected with a bottom plate 82 and a sensor 83 (CMOS/CCD sensor). The periphery of lens holder 4 is disposed with a plurality of coil winding members for winding a plurality of drive coils 84. On the supporting base 6 corresponding to the drive coils 84, there disposes a permanent magnet set 62 comprised of two magnets with opposing poles. The drive coils 84 includes at least a first coils 841 and a second coils 842 disposed respectively on the opposite sides of lens holder 4. The permanent magnet set 62 includes at least a first magnet 621 and a second magnet 622 stacked together and corresponding to the first coils 841 (or second coils 842) arranged on lens holder 4. The first coils 621 and second coils 622 are stacked together and wound in opposite directions that their poles facing the lens barrel 41 oppose each other. As such, the upper portion and lower portion of the permanent magnet set 62 facing the lens barrel 41 have opposing poles. At the same time, the location of first magnet 621 corresponds exactly to the horizontally extended coils from the upper half of first coils 841 (or second coils 842), while the second magnet 622 corresponds to the horizontally extended coils from the lower half of first coils 841 (or second coils 842). When a direct current is applied to first coils 841 (or second coils 842), the current directions of the horizontally extended coils at its upper half and lower half are opposite to each other as shown in FIG. 8, which, coupled with the first magnet 621 and the second magnet 622 stacked together with opposing poles, generates same direction driving force (e.g. upward or downward).

When lens barrel 41 is about to shift position, a predetermined current is passed through the first coils 42 and the second coils 43 disposed on lens holder 4, causing the two coils 42, 43 to generate magnetic lines in specific directions. The resulting magnetic action between first magnet 621 and second magnet 622 furnishes the force to push the lens holder 4 forward (upward) or backward (downward) along the axis of lens barrel 41. As such, the lens holder 4 holding the lens barrel 41 moves towards a predetermined direction to change the distance between lens barrel 41 and sensor 83 so as to achieve the purpose of focusing and zooming.

The snap-fit mechanism between cover 81 and supporting base 6 comprises a plurality of beveled protruding members 63 formed on the supporting base 6 coupled with a plurality of engaging holes 811 on cover 81 at the locations relative to the protruding members 63 (as shown in FIG. 8), such that cover 81 is secured to supporting base 6 through the engagement between engaging holes 811 and protruding members 63.

Through the structural design just described, the present invention of suspension apparatus for auto-focus lens device is able to reduce its overall volume, which represents excellent progress and contribution to miniaturization and enables it to be used in more products (e.g. notebook computer with built-in monitor or other portable electronic products) to provide better focusing and zooming function. The use of plastic injection molding to form supporting base 6, lens holder 4 and suspension spring 5 in one piece also greatly simplifies the manufacturing and assembly process that not only helps reduce production cost, but also addresses the problem of assembly inaccuracy.

The description above presents only a preferred embodiment of the present invention. In fact, the present invention can similarly offer the advantages of increasing the density of magnetic lines and the efficiency of magnetic force by arranging the permanent magnetic set on a movable lens holder and disposing the first coils and second coils on the supporting base.

What is claimed is:

1. A suspension apparatus for auto-focus lens device, comprising:
   a lens holder for positioning a lens unit;
   a supporting base formed with an opening for accommodate the lens holder; and
   at least a suspension spring comprising a base positioning end, a lens holder positioning end, and at least a connecting member situated therebetween;
   said connecting member providing the reposition elasticity between base positioning end and lens holder positioning end;
   wherein the lens holder is adjoined to the lens holder position end and the supporting base is adjoined to the base positioning end,
   wherein at least a drive coils are disposed on the periphery of lens holder, and at least a permanent magnet set is arranged on supporting base at the location corresponding to said drive coils,
   wherein said permanent magnet set includes at least a first magnet and a second magnet stacked together with opposing poles so that the poles of first magnet and the second magnet facing the lens barrel are opposite to each other; as such, the upper half and the lower half of said permanent magnet set facing the lens barrel have opposing poles,
   wherein when direct current is applied to said drive coils, the current directions of coils facing the first magnet and the second magnet are opposite to each other.

2. The suspension apparatus for auto-focus lens device according to claim 1, wherein said suspension spring is made of metallic material.

3. The suspension apparatus for auto-focus lens device according to claim 1, wherein said suspension spring is manufactured into a long strip by stamping process.

4. The suspension apparatus for auto-focus lens device according to claim 1, wherein said connecting member has the shape of multiple bends.

5. The suspension apparatus for auto-focus lens device according to claim 1, wherein at least one through-hole is disposed on the base positioning end of suspension spring for positioning.

6. The suspension apparatus for auto-focus lens device according to claim 1, wherein by passing a predetermined current through the drive coils disposed on lens holder, the lens holder is able to carry out linear displacement in a predetermined direction.

7. The suspension apparatus for auto-focus lens device according to claim 1, wherein the supporting base is further arranged with a cover engaged thereto.

8. The suspension apparatus for auto-focus lens device according to claim 7, wherein a snap-fit mechanism funished between the cover and the supporting base comprises a plurality of beveled protruding members formed on supporting base coupled with a plurality of engaging holes on the cover at the locations relative to the protruding members for engagement.

9. The suspension apparatus for auto-focus lens device according to claim 1, wherein said supporting base is further connected with a bottom plate and a sensor element at its bottom.

* * * * *